Sept. 20, 1971     M. E. WINTERS     3,605,718
VENT AND HINGE FOR GAS GRILL
Filed June 30, 1969     2 Sheets-Sheet 2
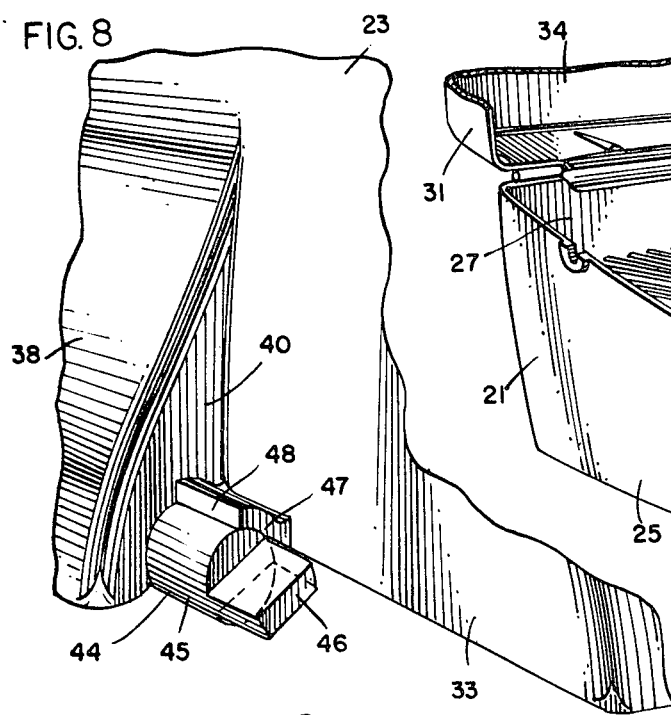
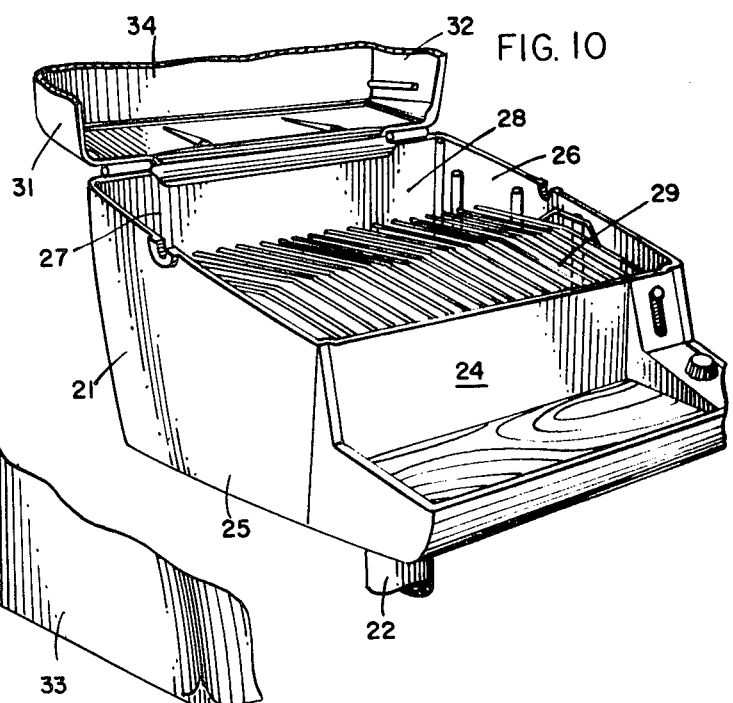
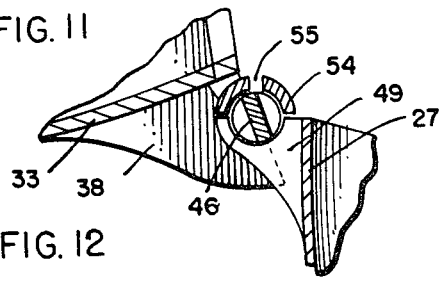
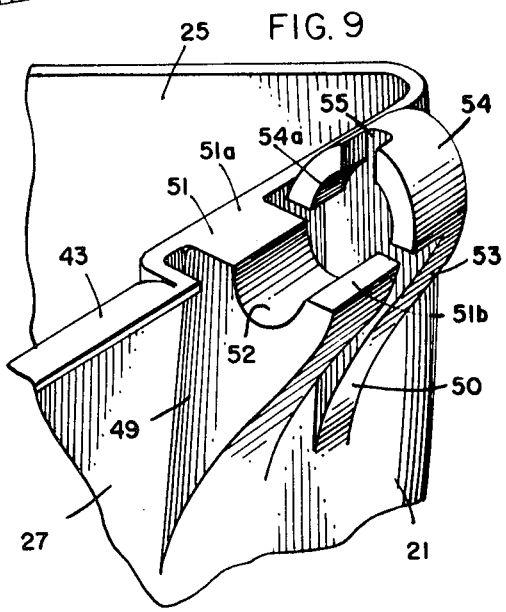
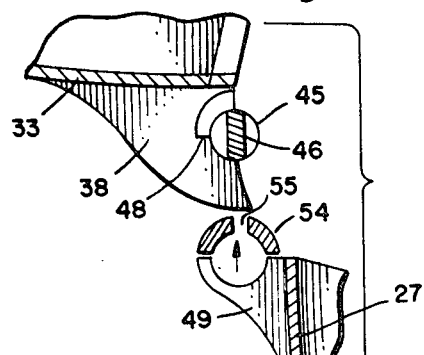
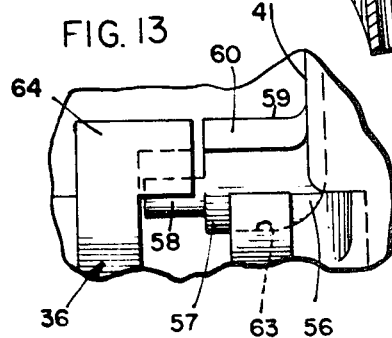
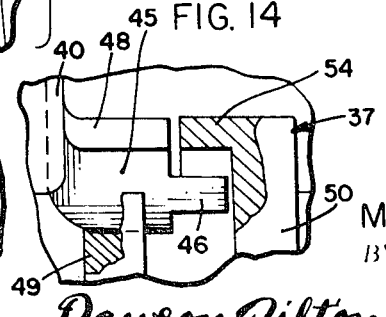
INVENTOR:
MELLIE E. WINTERS
BY
Dawson, Tilton, Fallon & Lungmus
ATT'YS ated Sept. 20, 1971

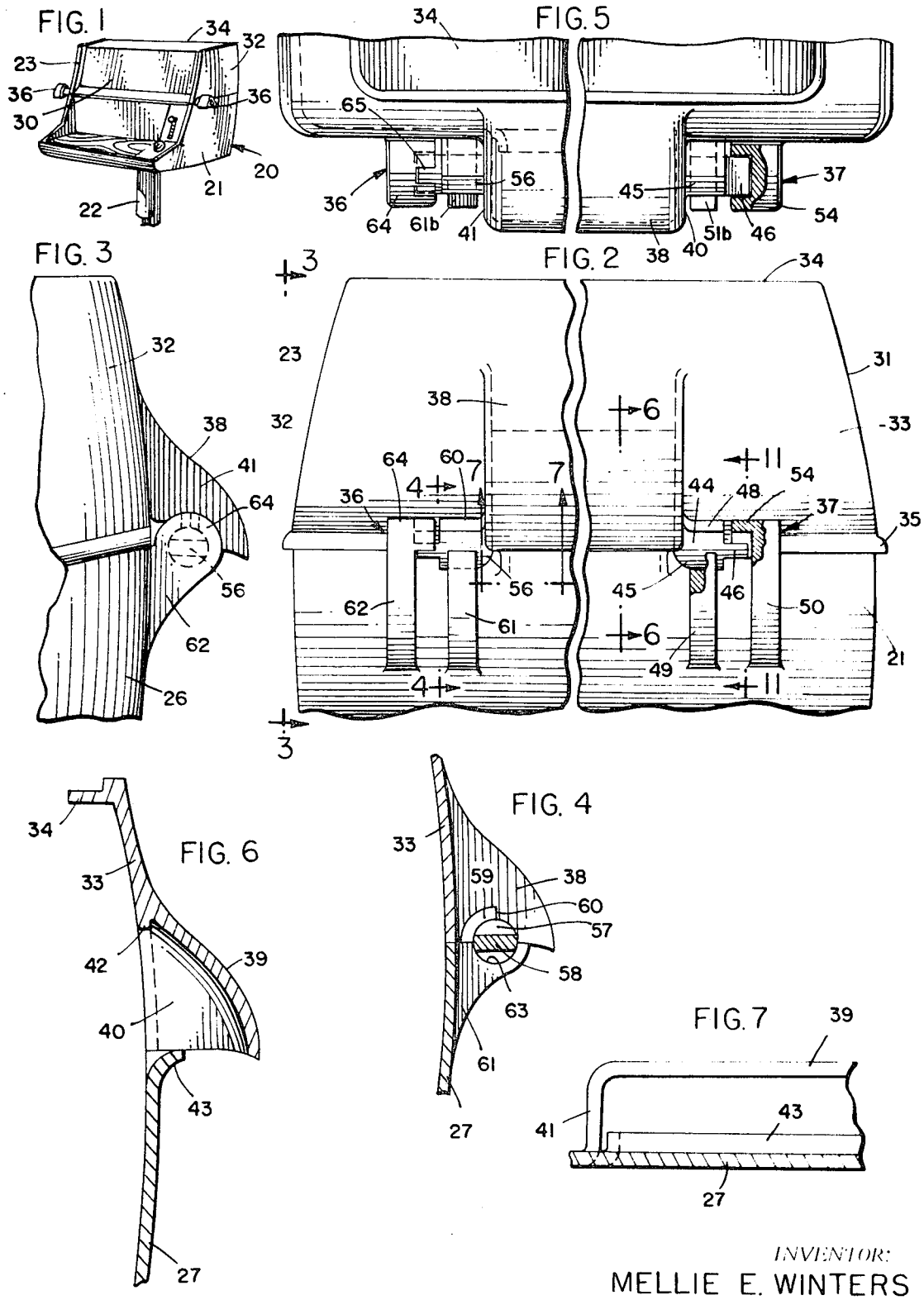

3,605,718
VENT AND HINGE FOR GAS GRILL
Mellie E. Winters, Wichita, Kans., assignor to The
Coleman Company, Inc., Wichita, Kans.
Filed June 30, 1969, Ser. No. 837,612
Int. Cl. A47j 37/00; B65d 43/16; E05d 1/06
U.S. Cl. 126—25                               12 Claims

ABSTRACT OF THE DISCLOSURE

A gas grill is provided with a flue vent and hinge means which are integrally formed with the grill by casting. The vent curves outwardly from the rear of the grill cover, and a pair of hinge pins extend laterally from the vent. The hinge pins are rotatably supported by hinge brackets which extend outwardy from the rear of the grill casing, and each hinge pin includes a retainer bar portion which extends under an arcuate retainer wall on the grill casing. Each retainer wall is provided with a slot therethrough, and the retainer walls acting against the retainer bar portions maintain the hinge pins on the support brackets to prevent inadvertent separation of the cover from the grill casing. The grill cover can be removed when desired by aligning the retainer bar portions with the slots in the retainer wall and by lifting the cover to pass the retainer bars through the slots.

BACKGROUND AND SUMMARY

This invention relates to outdoor barbecue grills and finds particular utility in outdoor gas grills. Gas grills are commonly formed by casting a grill casing and a grill cover. The casing provides a cooking enclosure, and the cover is adapted to fit over the top of the casing to close the top of the enclosure.

The cover must be readily removable from the casing to provide access to the cooking enclosure when the food is being placed on or removed from the grill or when the food is to be turned. It is preferable that the cover be hingedly secured to the casing so that the cook need merely rotate the cover to provide access to the cooking enclosure rather than having to lift the cover and place it on the ground. The hinge means must not only provide secure support for the cover while it is being opened, but it must prevent inadvertent separation of the cover from the casing and must support the cover in an opened position so that the cook may utilize both hands in preparing the food. However, the hinge means must also permit ready separation of the cover from the casing so that the cover can be cleaned or can be stored when open cooking is desired.

It is desirable that the hinge means be formed integrally with the grill, especially when the grill is cast, so that the manipulative steps of attaching the hinge means are eliminated and the integral nature of the grill is preserved. Further, integrally formed hinges eliminate the need for screws, clips, and the like which are easily lost. Integrally cast hinge means have been provided in the past, but these hinges have not proved to be entirely satisfactory. In particular, prior hinge means have not satisfactorily prevented inadvertent disengagement of the cover from the casing. It will be appreciated that the cover becomes quite hot when the grill is being used, and it is important that the cover be securely supported on the casing at all times.

A further problem has been encountered in providing the necessary flue vent to permit the smoke and combustion products of the burning gas to escape from the cooking enclosure. The flue vent should provide an exhaust path for these combustion products but at the same time should prevent rain, water from lawn sprinklers, and the like from entering the cooking enclosure.

The foregoing and other problems have been solved by this invention. A flue vent which curves outwardly and downwardly from the rear of the cover is cast integrally with the cover, and unique hinge pins extend laterally from the sides of the flue vent. The hinge pins are rotatably supported by support brackets cast integrally with the casing, and arcuately shaped retainer walls on the casing permit the hinge pins to rotate freely while retaining the hinge pins in place on the support brackets, thereby preventing inadvertent separation of the cover from the casing. The hinge pins include stop means which coact with the support brackets to maintain the cover in an open position, and the cover may be separated from the casing when desired by aligning the retainer bar portions of the hinge pins with the vertically extending slots in the retainer walls. When the retainer bars are so aligned, the weight of the cover is exerted almost entirely vertically downwardly on the support brackets, and a relatively substantial vertical lifting force must be applied to the cover to cause the retainer bars to pass through the retainer wall slots. The cover can be easily replaced merely by reversing the procedure and allow the retainer bars to pass downwardly through the slots.

DESCRIPTION OF THE DRAWING

The invention is explained in conjunction with an illustrative embodiment shown in the accompanying drawing, in which—

FIG. 1 is a perspective view of an outdoor gas grill embodying the invention;

FIG. 2 is an enlarged fragmentary rear elevational view, partially broken away, of the gas grill of FIG. 1;

FIG. 3 is a fragmentary side elevational view of the grill taken along the line 3—3 of FIG. 2;

FIG. 4 is a side sectional view taken along the line 4—4 of FIG. 2;

FIG. 5 is a fragmentary top plan view of the grill of FIG. 2;

FIG. 6 is a sectional side view taken along the line 6—6 of FIG. 2;

FIG. 7 is a fragmentary sectional view taken along the line 7—7 of FIG. 2;

FIG. 8 is an enlarged fragmentary perspective view of the rear of the cover of the grill showing one of the hinge pins extending from the flue vent;

FIG. 9 is an enlarged fragmentary perspective view of the casing of the grill showing one of the support brackets and retainer walls;

FIG. 10 is a perspective view of the grill with the cover in the fully opened position;

FIG. 11 is a sectional view such as would be seen along the site line 11—11 of FIG. 2 when the cover is in the opened position illustrated in FIG. 10;

FIG. 12 is a view similar to FIG. 11 showing the cover being separated from the casing;

FIG. 13 is an enlarged fragmentary view of a portion of FIG. 2 showing one of the hinge means; and FIG. 14 is an enlarged fragmentary view of a portion of FIG. 2 showing the other hinge means.

DESCRIPTION OF A SPECIFIC EMBODIMENT

Referring now to the drawing, and particularly FIGS. 1 and 10, the numeral 20 designates generally an outdoor barbecue grill which includes a grill casing 21 supported by a post assembly 22 and a grill cover 23 supported by the grill casing. The grill casing 21 is generally tub-shaped and includes a front wall 24, opposite side walls 25 and 26, a rear wall 27, and a bottom wall (not shown) which is attached to the support post 22. The walls of the casing 21 provide a cooking enclosure 28 and support a grate 29 on which the food to be cooked is placed.

As can be seen best in FIGS. 1–3, the cover 23 is similarly shaped and includes a front wall 30, side walls 31 and 32, rear wall 33, and top wall 34. When the cover is in the closed position as illustrated in FIGS. 1 and 2, the front, rear and side walls of the cover are seen to mate with the corresponding walls of the casing 21. The lower edge of the cover is provided with an outwardly and downwardly extending perimetric flange 35 which overlaps the upper edge of the casing to provide an effective seal between the cover and casing to lessen the escape of smoke, excessive heat, and the like. If desired, the cover may be provided with handles 36 (FIG. 1) which extend laterally from the side walls thereof.

The particular grill 20 illustrated is a gas grill designed for using non-combustible coals, and both the cover and the casing are generally rectangular in horizontal crosssection. It is to be understood, however, that the invention is not limited to gas grills or to grills of the particular shape illustrated.

As will be described more fully hereinafter, the rear walls of the cover and casing are provided with hinge assemblies designated generally by the numbers 36 and 37 (FIGS. 2 and 5) which rotatably support the cover on the casing for rotation from the closed position illustrated in FIG. 1 to the opened position illustrated in FIG. 10 while preventing inadvertent separation of the cover from the casing.

A somewhat scoop-shaped flue vent 38 is formed in the central portion of the rear wall 33 of the cover and includes an outwardly and downwardly curved rear wall 39 and a pair of side walls 40 and 41 which extends generally transversely from the rear wall of the cover. Referring to FIG. 6, the exterior surface of the rear vent wall 39 is seen to merge smoothly with the exterior surface of the rear wall 33 of the cover, and the rear cover wall 33 extends downwardly from the juncture with the rear vent wall 39 to provide a depending interior lip 42 which extends between the vent side walls 40 and 41. Still referring to FIG. 6, the rear wall 27 of the casing is provided with an outwardly curved lip 43 adjacent its upper edge between the vent side walls 40 and 41, and the rear vent wall 39 is seen to extend outwardly beyond the end of the lip 43 to provide a protective overhead thereabove.

Combustion products and smoke formed within the cooking enclosure during operation of the grill may escape from the cooking enclosure through the flue vent provided in the cover, and the lip 43 not only provides a smooth flow path for gases escaping from the lower portion of the cooking enclosure but also serves to restrain outside air from entering the cooking enclosure through the flue vent. The scoop-shaped vent overhangs the lip 43 and thereby prevents rain, sprinkler water and the like from entering the enclosure. As can be seen best in FIG. 6, the vent wall 39 extends slightly below the lip 43, of the order of ⅛ inch to substantially prevent air flow into the grill. During cooking, grease may splatter against the cover and drip down the walls thereof, but the lip 42 prevents grease from dripping along the rear vent wall 39 and out of the flue opening. The grease dripping down the central portion of the rear wall 33 of the cover will drip from the bottom of the lip 42 to the curved lip 43 and into the bottom of the casing, which may be provided with suitable grease collecting means.

Each of the hinge assemblies 36 and 37 include a hinge pin on the cover which extends laterally outwardly from the flue vent 38 and which is rotatably supported by a hinge support bracket formed on the casing. Referring to FIGS. 2, 8 and 14, the hinge means 37 includes a hinge pin 44 which extends generally transversely from the vent side wall 40 along the rear wall 33 of the cover. The hinge pin 44 includes a generally cylindrical support portion 45 which provides an outer curved surface and a retainer bar portion 46 which extends axially from the support portion 45 and is generally rectangular in transverse cross section. The hinge pin 44 also includes a radially enlarged portion 47 between the upper portion thereof and the rear wall 33 of the cover, and the radially enlarged portion 47 provides a flat stop shoulder 48.

Referring to FIGS. 2, 9 and 14, the hinge 37 also includes a support bracket 49 and a retainer bracket 50 which extend outwardly from the rear wall 27 of the casing 21. The support bracket has a flat upper surface 51 which extends generally horizontally outwardly from the upper edge of the casing 21 and which is provided with a generally semi-cylindrical recess or groove 52. The groove 52 extends generally parallel with the rear walls of the cover and the casing and separates the upper surface 51 of the support bracket into inner and outer ledge portions 51a and 51b, respectively.

The retainer bracket 50 includes a support wall portion 53 which extends outwardly from the rear wall of the casing and a retainer wall portion 54 which is generally annularly shaped and which extends generally coaxially with the groove 52. The annular retainer wall 54 provides a curved lower surface 54a which extends over an arc of about 180° from just above the ledge 51a to just above the ledge 51b, and the wall is provided with a slot 55 therethrough at the uppermost portion of the wall.

Referring to FIGS. 2 and 13, the hinge 36 similarly includes a hinge pin 56 which extends generally transversely from the flue vent wall 41 and generally parallel with the rear cover wall. The hinge pin 56 includes a cylindrical portion 57, a retainer bar portion 58, and a radially enlarged portion 59 which provides a stop shoulder 60. The hinge 36 also includes a support bracket 41 and retainer bracket 62 which extend outwardly from the rear wall of the casing and which provide, respectively, a support groove 63 and a retainer wall 64. Similarly, the upper portion of the retainer cover 64 is provided with a slot 65 (FIG. 5).

The curvature of each of the generally semi-cylindrical grooves in the support brackets 49 and 61 is generally the same as the curvature of the outer surface of each of the cylindrical portions 45 and 57, respectively, of the hinge pins 44 and 56 so that the hinge pins are securely but freely rotatably supported by the support brackets. The retainer bar portions 46 and 58 of the hinge pins are seen to be generally rectangular in cross section and have a long dimension and a short dimension. Each of the retainer bar portions extend generally axially from the center of the respective cylindrical portions, and the long dimension thereof is substantially the same as the diameter of the cylindrical portion and also substantially the same as the diameter of the curvature of the arcuate interior surface of the annularly shaped retainer walls 54 and 64. The width of each of the slots provided in the retainer walls is slightly greater than the short cross sectional dimensions of the retainer bar portions so that each of the retainer bar portions may pass through the slot of the respective retainer wall when the retainer bar is properly aligned therewith.

Both the casing 21 and the cover 23 may advantageously be formed integrally of die cast aluminum or similar material. The hinge pins 44 and 56 may then be cast integrally with the cover, and the support brackets 49 and 61 and retainer brackets 50 and 62 may similarly be formed integrally with the casing. Although the support brackets and retainer brackets are shown to extend from the rear casing wall in spaced-apart fashion, these portions of the casings could be merged to extend integrally from the casing. However, I have found that the configurations of the support brackets and retainer brackets illustrated are particularly advantageous when these parts are formed by casting.

OPERATION

When the grill is being used, the cover is generally kept in the closed position illustrated in FIGS. 1–3. In this position, the cover is supported around the lower edge thereof by the upper edge of the casing, and the edge flange 35 of the cover extends downwardly over the edge of the casing. The combustion products and smoke may escape from the cooking enclosure through the vent 38 as previously described, and the overhanging vent and the lip 43 on the casing prevent the entry of water and air from outside of the grill.

When the cover is in the closed position, the cover is also supported at the rear thereof by the support brackets 49 and 61, the recesses of which receive the cylindrical portions of the hinge pins 45 and 56. When the food is to be turned or removed, the cover may be lifted by the handles 36 (FIG. 1) to cause the cover to pivot upwardly and rearwardly about the hinge pins. The curvature of each hinge pin is approximately the same as that of the grooves provided in the support brackets, and the hinge pins may rotate freely in the grooves without substantial wobbling or transverse movement of the pins within the grooves. Similarly, the long cross sectional dimension of each of the retainer bar portions is slightly less than the diameter of the curvature of the lower surface of each of the retainer walls 54 and 64, and the retainer bar portions may rotate freely below the retainer walls.

Referring to FIGS. 4, 13, and 14, when the cover is in the closed position, the long cross sectional dimensions of the retainer bar portions extend generally horizontally. As the cover is first raised, a substantial vertical lifting force is applied to the handles on the cover to lift the cover and to rotate it about the rear thereof, but the cover is prevented from becoming separated from the casing by the retainer walls 54 and 64 which, while permitting rotation of the retainer bar portions, prevent upward movement thereof and retain the hinge pins in the grooves of the support brackets. As the hinge pins rotate through approximately 90°, the direction of the force applied to the handles and to the cover changes to substantially rearward, and the retainer walls at all times serve to retain the hinge pins in place. As the long dimension of each of the retainer bar portions becomes aligned with the slot through the retainer wall, the opening force exerted on the cover is almost entirely horizontally rearwardly, and the weight of the cover prevents the retainer bar portions from inadvertently passing upwardly through the slots.

The cover is continued to be rotated rearwardly until the flat stop shoulders 48 and 59 of the hinge pins engage the rear ledge portions 51b and 61b (FIGS. 4 and 5) of the support brackets 49 and 61, respectively. The engagement of each of the stop shoulders with the upper surface of a support bracket prevents further rearward rotation of the cover, and the location of the stop shoulders along the exterior surface of the hinge pins is such that the shoulders do not contact the support brackets until the center of gravity of the cover has been moved rearwardly of the pivot provided by the hinge pins and support brackets. In the embodiment illustrated the stop shoulders are positioned to allow rotation of the hinge pins of slightly more than 90°. The weight of the cover will thereby maintain the cover in an opened position as illustrated in FIGS. 10 and 11, in which the cover is supported by the cylindrical portions and stop shoulders of the hinge pins which bear against the grooves and upper surfaces, respectively, of the support bracket.

As can be seen best in FIG. 11, the short outer sides of the retainer bar portions sweep adjacent the lower surfaces of the retainer walls as the hinge pins rotate. This slight clearance between the retainer bars and the retainer walls substantially eliminates undesired transverse movement of the hinge pins with respect to the support brackets. Further, the outer ends of the hinge pins extend almost to the support wall of the respective retainer walls (FIGS. 13 and 14) and side-to-side movement of the cover with respect to the casing is substantially prevented.

When the cover is to be closed, an initial force in a direction substantially horizontally forward is applied to the cover to rotate the hinge pins, and as the retainer bars become aligned with the slots in the retainer walls, the downward force exerted by the weight of the cover prevents the retainer bars from passing through the slots If it becomes necessary to clean the cover or if it is desired to remove the cover from the casing for rotisserie cooking or the like, the cover may be quickly and easily separated from the casing. The cover is rotated through about 90° until the long dimension of each of the retainer bar portions is aligned with the slot in the respective retainer wall, and then a vertical lifting force is exerted on the cover to lift the retainer bar portions through the slots in the retainer walls as illustrated in FIG. 12. Since the weight of the cover must be overcome, a relatively substantial vertical lifting force must be applied in order to separate the cover from the casing, and it will be appreciated that a force having such a vertical component will not ordinarily be applied to the cover when routinely opening and closing the cover.

While in the foregoing specification, I have described detailed descriptions of specific embodiments of my invention for the purpose of illustration, it is to be understood that many of the details herein given may be varied considerably by those skilled in the art without departing from the spirit and scope of my invention.

I claim:

1. In an outdoor grill having a casing providing a cooking enclosure accessible through a top opening and a cover for closing the top opening, a hinge pin on said cover, said hinge pin including a generally cylindrical support portion providing a curved exterior surface and a retainer portion extending generally axially from the support portion, a hinge support bracket on said casing, the upper portion of the support bracket being provided with an arcuate groove, the support portion of the hinge pin being received by said arcuate groove and rotatably supported by the support bracket, a retainer wall on said casing above the retainer portion of the hinge pin, said retainer wall having a curved lower surface and being provided with a slot therethrough whereby said retainer portion may pass through said slot when the hinge pin is rotated to align the retainer portion with the slot.

2. The structure of claim 1 in which said retainer portion is generally rectangular in transverse cross section and has a long cross sectional dimension and a short cross sectional dimension, said slot being slightly wider than the short cross sectional dimension of the retainer portion.

3. The structure of claim 1 including stop means on said cover for engaging said hinge support bracket after predetermined rotation of said support pin to limit further rotation thereof.

4. The structure of claim 3 wherein said stop means is positioned to engage said support bracket after the center of gravity of the cover has been rotated over the arcuate groove of the support bracket, said retainer portion being unaligned with said slot when said stop means engages said support bracket and when the cover closes the top opening.

5. In an outdoor grill having a casing and a cover above the casing, said casing including a front wall, a rear wall, opposite side walls and a bottom wall and providing a cooking enclosure, said cover including a front wall, a rear wall, opposite side walls and a top wall,
  (a) a pair of spaced-apart hinge pins on the rear wall of the cover, each hinge pin including a generally cylindrical support portion providing a curved exterior surface and a retainer bar portion extending generally axially from the support portion, said retainer bar portion being generally rectangular in transverse cross section and having a long dimension and a short dimension in transverse cross section, the axis of said support portion extending generally parallel with the rear wall of the cover,
(b) a pair of spaced-apart hinge support brackets on the rear wall of the casing, each of the hinge support brackets providing a generally semi-cylindrical groove receiving and rotatably supporting the generally cylindrical support portion of one of the hinge pins, the curvature of each groove being substantially the same as the curvature of each support portion,
(c) a pair of retainer walls on the rear wall of the casing, each of said retainer walls having a curved lower surface and being positioned above one of the retainer bar portions, each retainer wall having a generally vertically extending slot therethrough, the width of each slot being greater than the short cross sectional dimension but less than the long cross sectional dimension of each retainer bar portion whereby said retainer bar portions may pass through said slots when the hinge pins are rotated to align the long dimensions of the retainer bar portions with the slots.

6. The structure of claim 5 in which the diameter of the curvature of each retainer wall is approximately the same as the long dimension of each of the retainer bar portions whereby the sides of the retainer bar portions sweep adjacent the retainer walls as the cover is rotated about the support brackets.

7. The structure of claim 5 in which the rear wall of the cover includes a vent portion extending outwardly from the remainder of the rear wall providing a vent opening between the cover and the casing, each of said hinge pins extending from the vent portion.

8. The structure of claim 7 in which said vent portion includes an outwardly and downwardly curved rear wall and a pair of side walls extending generally transversely from the rear wall of the cover, said hinge pins extending generally transversely from the vent side walls.

9. The structure of claim 5 in which said hinge pins are formed integrally with said cover by die casting and said support brackets and retainer walls are formed integrally with said casing by die casting.

10. In an outdoor grill having a casing and a cover above the casing, said casing including a front wall, a rear wall, opposite side walls and a bottom wall and providing a cooking enclosure, said cover including a front wall, a rear wall, opposite side walls, and a top wall, the rear wall of the cover including a vent portion extending outwardly from the remainder of the cover rear wall, said vent portion including an outwardly and downwardly curved rear wall and side walls extending from the cover rear wall to the vent rear wall, a hinge pin extending from each of the vent side walls, hinge support brackets on said casing rotatably supporting said hinge pins, and retaining means on said casing extending above said hinge pins for normally maintaining said hinge pins on said support brackets.

11. The structure of claim 10 in which said cover rear wall extends downwardly from the vent rear wall between the vent side walls to provide a depending lip, the upper edge of the casing rear wall curving upwardly and outwardly between the vent side walls.

12. The structure of claim 10 in which the vent portion and hinge pins are formed integrally with the cover by die casting and the support brackets and retaining means are formed integrally with the casing by die casting.

References Cited
UNITED STATES PATENTS

| | | | |
|---|---|---|---|
| 2,011,674 | 8/1935 | Cawood | 220—31 |
| 3,298,361 | 1/1967 | Clark | 126—25 |
| 3,386,432 | 6/1968 | Hanson | 126—41 |
| 3,388,421 | 6/1968 | Koziol | 16—171 |

CHARLES J. MYHRE, Primary Examiner

U.S. Cl. X.R.

16—171; 220—31